Feb. 23, 1954    R. B. WHITE, JR    2,670,414
SWITCH
Original Filed June 24, 1946    3 Sheets-Sheet 1

INVENTOR.
ROBY B. WHITE JR.
BY
[signature]
[signature] Roderick B. Jones
ATTORNEYS

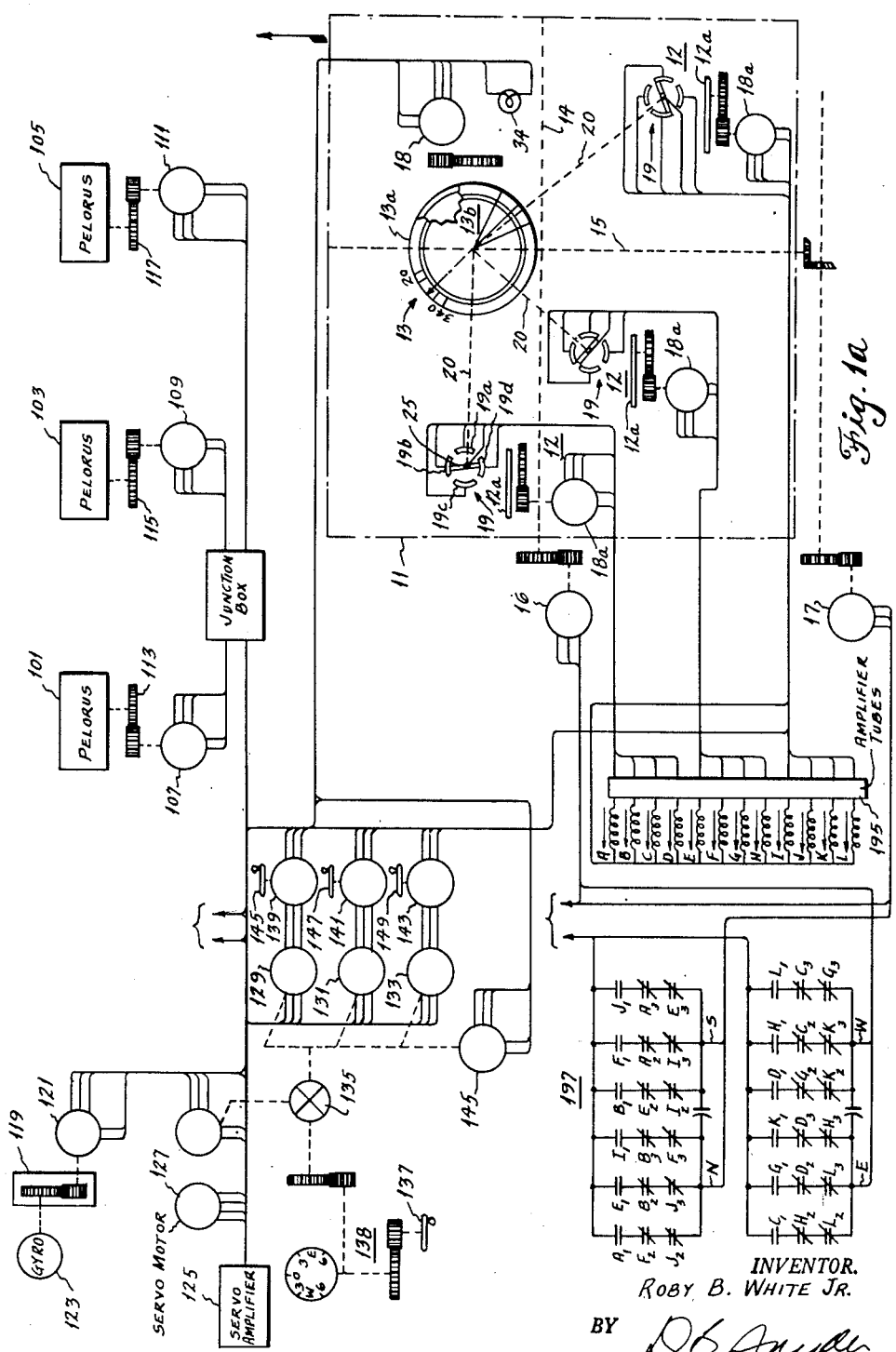

Feb. 23, 1954   R. B. WHITE, JR   2,670,414
SWITCH

Original Filed June 24, 1946   3 Sheets-Sheet 3

INVENTOR.
ROBY B. WHITE JR.
BY
ATTORNEYS

Patented Feb. 23, 1954

2,670,414

UNITED STATES PATENT OFFICE 2,670,414

SWITCH

Roby Byron White, Jr., Irving, Tex.

Original application June 28, 1946, Serial No. 678,755. Divided and this application May 13, 1952, Serial No. 287,577

2 Claims. (Cl. 200—52)

(Granted under Title 35, U. S. Code (1952), sec. 266)

The invention described herein may be manufactured and used by or for the Government of the United States of America for governmental purposes without the payment of royalties thereon or therefor.

This invention relates in general to electrical switches, and is disclosed as applied in a device for continuously and automatically indicating the position of a movable body with relation to known fixed objects. This application is a division of my co-pending application Serial No. 678,755 filed June 24, 1946.

As used herein, the term "synchro" means a self-synchronous motor, generator, or system, also commonly known under other names such as "selsyn," "autosyn," and "synchrotie," and the term "synchro" will be used in the specification and claims to denote apparatus as thus defined.

An object of this invention is to provide an electrical switch adapted for use in a device for continuously and automatically indicating the position of a movable body with respect to fixed objects of known position.

Another object is to provide an electrical switch for use with a craft-position repeater, said switch including a contact member adjustable rotatably in accordance with changes in craft orientation.

Further objects and advantages of this invention, as well as its arrangement, construction and operation, will be apparent from the following description and claims in connection with the accompanying drawings, in which Fig. 1 is a schematic plan view of the plotting table and associated apparatus;

Similar numerals refer to similar parts throughout the several views.

Figure 1:
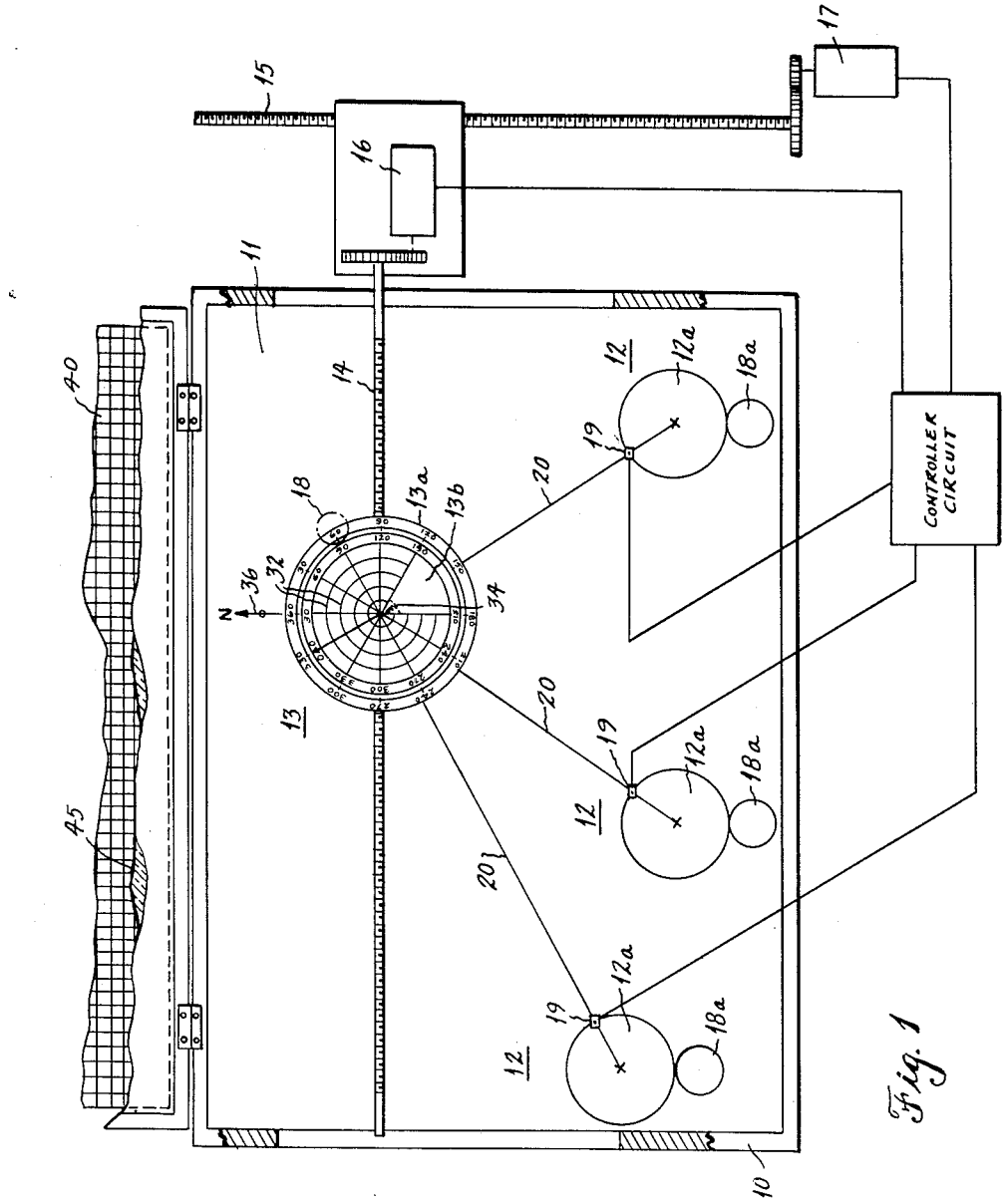
Fig. 1a is a block diagram, partly schematic, of the complete apparatus.

In Fig. 1 there is shown apparatus for continuously and automatically indicating the position of a ship, the apparatus comprising a rectangular box 10 adapted to be mounted on the ship, and having a bottom wall serving as a table 11 or the like. A plurality of bearing repeaters 12 are disposed on the table 11 to represent, by their position, the location of fixed objects or land marks outside the ship, said repeaters 12 being movably positioned on table 11. A ship's position indicator 13 is mounted for movement over table 11. The position of indicator 13 on the table 11 is controlled by an east-west positioning screw 14 and a north-south positioning screw 15, which screws 14 and 15 are operated by motors 16 and 17 respectively. Electrical contacts 19 on the bearing repeaters 12 operate to control motors 16 and 17, as will be hereinafter described, whereby the position of position indicator 13 is controlled across the entire area of table 11.

Operably connected to position indicator 13 is a synchro motor 18 which is operated by means of a gyro compass 123 (Fig. 1a) or the like, to maintain the position indicator pointing to the true heading of the ship.

The position indicator 13 comprises a pair of relatively rotatable circular scales 13a and 13b, the scale 13a being of annular shape, and scale 13b being a disc concentrically mounted within the annulus of scale 13a. Each of the scales 13a and 13b are preferably of Lucite or other transparent material on which 0 to 360-degree graduations can conveniently be engraved and filled with opaque ink or the like. As shown, the degree markings on each scale 13a and 13b advance in clockwise direction about the center of the indicator 13. Reading of scale 13a as by means of a reference arrow 30 formed at the 000 mark on scale 13b indicates the instant true ship's heading as controlled by the gyroscope of the ship (not shown), while reading of scale 13b according to the position of the 360° mark on scale 13a indicates the relative bearing from the ship's heading.

Scale 13b is graduated further in a series of concentric arcs of circles 32 having progressively increasing radii of curvature. Circles 32 can be calibrated to indicate range of an object from the ship on which the indicator is mounted.

The indicator 13 is preferably housed in a case (not shown) with the annular scale 13a secured to the case and the disc scale 13b mounted for rotation within the case about the longitudinal axis thereof. A light 34 placed beneath ring 13a and card 13b projects their calibrations and the ship's position and heading onto a chart or map 40 placed on a transparent top 42 of box 10 above table 11.

In operating the indicator 13, the scale 13a is adjusted preliminarily so that the 180°–360° line thereof is aligned with an arbitrary North or fiducial mark 36 that is formed on the table 11. Scale 13b is then rotated independently of synchro 18 until the arrow 30 is directed toward the scale 13a indication that represents the true instant heading of the ship. This independent rotation of scale 13b is accomplished by loosening an adjustment screw (not shown) by means of which the scale is secured normally to the shaft of the synchro 18. After the independent rotation of scale 13b, the adjustment screw is tightened so that the scale 13b is rotated by the synchro. Synchro 18 is connected electrically to a transmitting synchro, as will appear hereinbelow, which, in turn, is geared to the gyro of the ship. The same gear ratio exists between synchro 18 and scale 13b. Hence, the arrow 30 always indicates on scale 13a the true instant heading of the ship, as controlled by the gyroscope of the ship.

Having thus described the components of the apparatus illustrated in Fig. 1, attention is now directed to Fig. 1a for a detailed description of the complete system.

Fig. 1a discloses, in block diagrammatic form, the position indicating apparatus constructed according to the present invention. To provide navigational fixes of a craft bearing the apparatus, in accordance with the present invention, true reverse bearings of at least two landmarks are projected upon a chart upon which the spatial interrelationship of the landmarks is known. Actual pelorus bearings of the craft are obtained by simultaneously sighting on three preselected landmarks (not shown) by means of conventional peloruses 101, 103 and 105. While three peloruses are herein disclosed and described, it will be understood that this particular number is not essential. Any number of peloruses more than one may be used, the set of three here shown being exemplary only.

The operation of lining up the pelorus sights on the associated landmarks drives respective synchro generators 107, 109, 111 that are mounted fixedly on the craft. The rotors of the generators are connected to the respective pelorus sighting element through suitable high-ratio gear trains 113, 115, 117, respectively, so that the angular displacement of the synchro rotor is proportional to the relative bearing of the landmark and the craft.

As is well known in the art of navigation, reverse true bearings are obtainable from relative bearings by adding thereto the gyro heading of the craft (corrected for gyro error) and 180°. In the apparatus of the invention, the operation of converting relative bearing to reverse true bearing is accomplished by means of an assemblage of differential synchros and mechanical differentials.

Thus, as shown, a mechanical pick-up 119, having the same mechanical ratio to a synchro generator 121 as the peloruses 101, 103, 105 have to the respective synchro generators 107, 109, 111, is connected to the gyro 123 of the craft. Accordingly, swinging the craft through 360° has the same effect as rotating a pelorus 360°. Inasmuch as the pelorus is sighted on a remote landmark while the craft swings, the addition of gyro heading to the pelorus yields no change in true bearing.

The electrical output of the synchro generator 121 is repeated by a servo amplifier 125 and servomotor 127 of which the output is utilized mechanically to drive a set of three differential synchros 129, 131, 133, and a synchro generator 145 through a mechanical differential mechanism 135.

Gyro error correction is introduced, if required, through the differential mechanism 135 by means of a handcrank 137 and suitable speed-changing gearing 138.

The electrical outputs of the synchro generators 107, 109, 111 driven from the peloruses are fed through a junction box into the corresponding differential synchros 129, 131, 133 and, since gyro heading and error are also fed into these differential synchros, the outputs thereof are true bearing. Conversion to true reverse bearing is accomplished by rotating the stators of the differential to introduce the factor of 180°.

The outputs of the differential synchros 129, 131, 133 are desirably fed into a second set of differential synchros 139, 141, 143 having normally fixed stators and rotors, but which can be adjusted in relative orientation as by handcranks 145, 147, 149 to correct for mechanical misalignments at the time of first setting up the apparatus for operation.

In the foregoing description, the details of construction of the various synchro devices, the peloruses, the gyro, the servomotor and amplifier have been omitted since such devices are of conventional design and, accordingly, such details are well known to those skilled in the art. In the drawing, electrical connections are shown by solid lines using a conventional single line for a multiple conductor cable where obvious. Mechanical linkages and connections are designated by broken lines.

The plotting table 11 is shown, in Fig. 1a, by dot-dash lines, and corresponding parts disposed thereon are indicated by the same reference characters as employed in Fig. 1.

The bearing repeaters 12 are controlled by synchro motors 18a, each of which is, in turn, controlled by a corresponding synchro generator 107, 109, 111 driven by peloruses 101, 103, 105 which, for example, can be manually controlled by a member of the ship's crew, and which is aimed constantly at the external land mark corresponding respectively with each bearing repeater 12. Accordingly, as the bearing of the land mark with respect to the ship is changed, the angular position of the bearing repeater on the table 11 is changed. In order to insure that the angular position of bearing repeaters represents the true reverse bearing of the corresponding land marks, the synchro motors 18a are set off from the corresponding relative bearing by an amount equal to the gyro heading of the ship, plus or minus the gyro error, plus 180° as described above.

Figure 2:
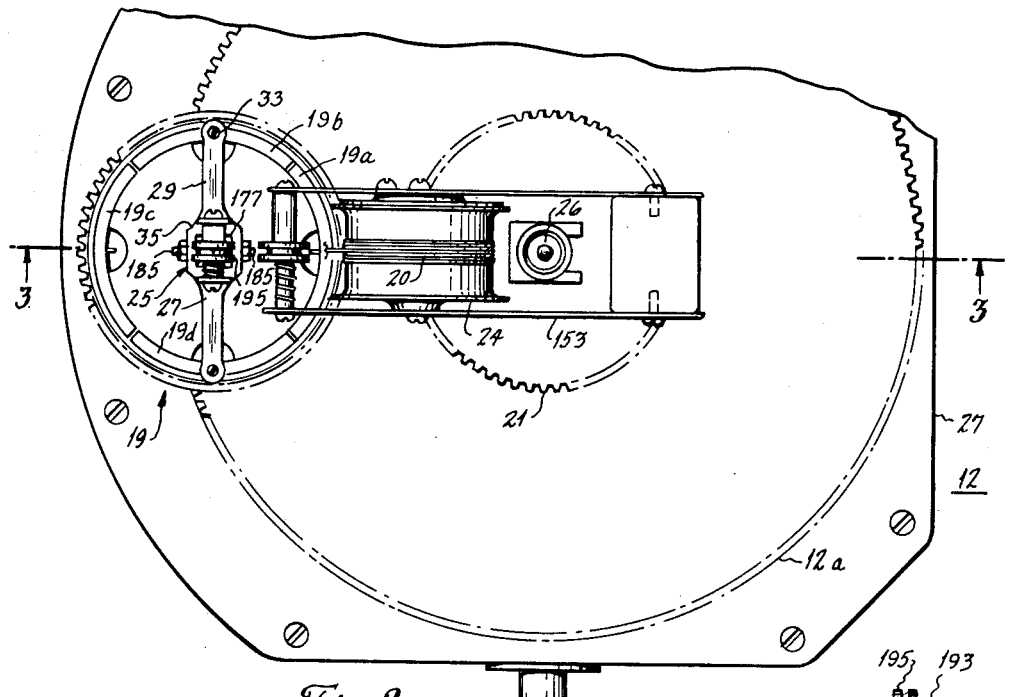
Fig. 2 is a plan view of one of the bearing repeaters used with this invention.
Figures 3, 4:
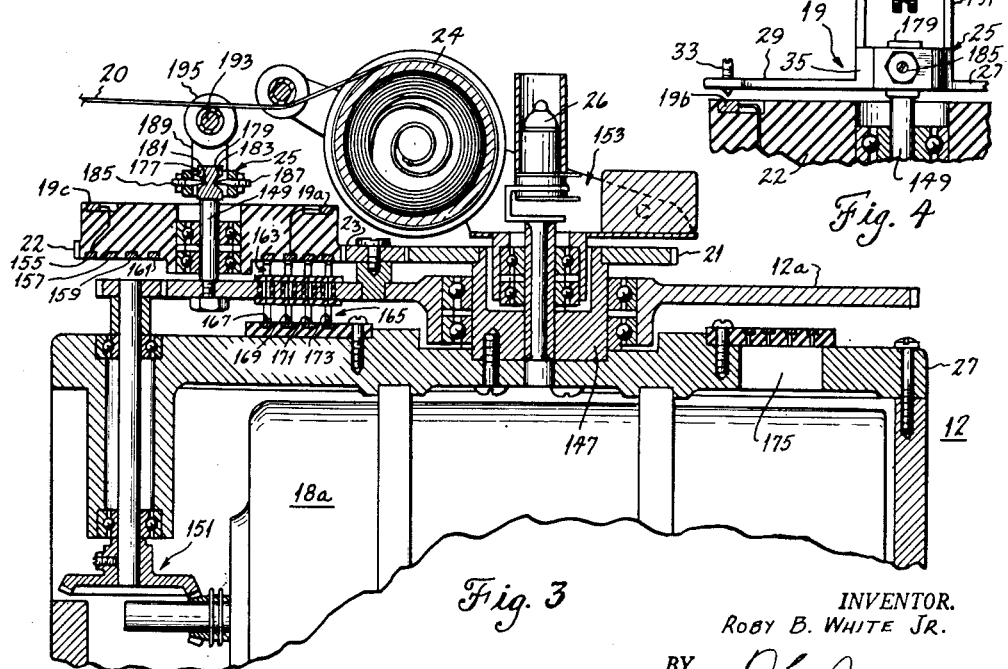
Fig. 3 is a view in cross section taken along the line 3—3 of Fig. 2.
Fig. 4 is an enlarged elevation view, partly in cross section, of a part of a contactor switch mechanism illustrated in Figs. 2 and 3, showing a preferred embodiment of the invention.

There is shown in Figs. 2, 3 and 4 the mechanism that maintains the multiple contact 19 at the same north-south orientation when bearing repeater 12 rotates. A gear 21 is fixed, as by spacer member 147, to the case 27 of bearing repeater 12 and is mounted coaxially with top plate 12a so as to be stationary with respect to case 27. Another gear 22, of the same diameter as gear 21, is mounted by means of a spindle 149 on top plate 12a, but free to turn. An idler gear 23, mounted on top plate 12a, is placed between gears 21 and 22 so that when top plate 12a is rotated by synchro motor 18a through a suitable transmission 151, the north-south orientation of gear 22 remains the same. A cable or wire 20 is wound on a spring drum 24 that is mounted in a suitable frame 153, which is, in turn, coaxially disposed with respect to top plate 12a but is free to turn relative thereto so that cable 20 is always on the straight line between the centers of bearing repeater 12 and position indicator 13 (Fig. 1).

The multiple-contact mechanism 19 and associated lever 25, illustrated diagrammatically in Figs. 1 and 1a, are shown in detail in Figs. 2, 3 and 4. As shown, the multiple contact 19 comprises a commutator ring having four arcuate conductive segments 19a, 19b, 19c, and 19d mutually insulated from each other and mounted at the periphery of gear 22. If desired, gear 22 can be fabricated of insulation material and the segments 19a–19d imbedded or suitably molded on the upper surface thereof. Insulatingly spaced slip rings 155, 157, 159, 161 are concentrically arranged on the lower surface of gear 22 and conductive connection between segments 19a–19d and slip rings 155—161, respectively, can be effected in any suitable manner, as by threading pieces of wire through openings in the body of gear 22 and soldering the wires to the corresponding segments and slip rings.

Two sets of brushes 163, 165 are carried by top plate 12a, one set 163 on the upper surface of plate 12a and engaging slip rings 155—161. The other set of brushes 165 is mounted on the underside of plate 12a and engages slip rings 167, 169, 173, which are insulatingly spaced in concentric array on the case 27 of the bearing indicator 12.

Respective brushes of set 163 are individually electrically connected to brushes of set 165 by suitable conductors insulated from plate 12a, as shown. Connection to individual rings 167—173 from external circuit arrangements can be effected by passing any conventional cable (not shown) through an opening 175 in the cover plate of case 27.

Pivotally supported on top plate 12a and disposed for motion relative to and above the commutator ring is the lever 25 having a pair of oppositely extending arms 27, 29, each of which arms is provided with a respective contact point 31, 33. The lever 25 is formed with a medial body portion 35 having a transverse rectangular opening 177 substantially larger than a rectangular cap 179 formed at the upper end of shaft 149 and into which opening the cap is adapted to be passed in balance-mounting the lever 25. As shown (Fig. 3) the cap 179 is formed inwardly extending conical recesses 181, 183, in opposed sides thereof and providing bearing surfaces for screws 185, 187 carried by the body portion 35. The lever is balanced and pivoted by the screws 185, 187 so that the contacts 31, 33 normally clear the segments by a very small distance, as seen in Fig. 4.

A pair of parallel supports 189, 191 are formed on the body portion 35, which support a transverse pin 193 on which a grooved wheel 195 is rotatable freely. The fine wire or cable 20 passes freely through the groove in wheel 195 normally without bearing against the walls thereof.

In operation, in the position shown in Fig. 2, when the top plate 12a of the bearing repeater 12 is rotated slightly by motor 18a, gear 22 is caused to roll on idler 23, which, in turn rolls around gear 21. As above described, the orientation of gear 22 is unchanged by such rotation. However, since lever 25 is angularly displaced at the rotation of plate gear 12a, lever 25 is tipped as a result of the torque exerted by cable 20 on the wall of the grooved wheel 195, and the contact at one of the segments, say that at 19b, closes, causing motor 17 (Figs. 1 and 1a) to rotate, as will be described hereinbelow.

As shown in Fig. 1a, the multiple contact assemblies 19 of each of the repeaters 12 are connected through a suitable amplifier arrangement 195 to a relay control circuit 197. The amplifier arrangement 195 can be any suitable combination of vacuum-tube amplifiers wherein the leads from individual segments of the segments 19a–19d are connected to respective control grids of corresponding tubes (not shown), thereby to initiate the flow of plate current upon the occurrence thereat of a positive voltage. The plate circuits of the respective tubes include electromagnetic relay coils A–L each of which actuates a respective set of three relay contacts $A_1$, $A_2$, $A_3$, ... $L_1$, $L_2$, $L_3$. The contacts are shown, in symbols employed in conventional electrical engineering practice, as signs for those contacts open normally and + signs for those contacts closed normally.

Operation of the relays controls the motors 16 and 17 and consequently controls the direction in which the position indicator 13 is caused to move. For example, if the bearing repeater at the left-hand side of table 11 is actuated so that the lever 25 thereof contacts segment 19d, relay B completes the circuit in lead S, simultaneously opening the circuits $B_2$ and $B_3$ in lead S. Thus relay B has assumed control of motor 17, the north-south control motor, and drives that motor so as to move the position indicator 13 in a south direction until correct positioning of the indicator 13 restores the actuating wire 20 to proper alignment, whereupon the lever 25 is restored to balanced condition. At this point, contact with segment 19d is broken.

In the event that motor 17 causes indicator 13 to overshoot its mark, misalignment of wire 20 causes the lever contact to be made at segment 19b, energizing relay coil A. Energization of coil A causes actuation of contacts $A_1$, $A_2$ and $A_3$, thereby completing the circuit in lead N and braking the circuit $A_2$ and $A_3$. Motor 17 now drives the position indicator 13 in the north direction until proper alignment of wire 20 restores the lever 25 to the balance position.

Two contacts will close simultaneously only when the bearing is nearly NE, NW, SE or SW; for any other bearing only one contact will close. For example, if bearing repeater 12 is lined up in the north-south direction, rotation will cause only one of contacts 19a or 19c to close, causing motor 16 to rotate, and if bearing repeater 12 is lined up in the east-west direction, rotation will cause only one of contacts 19b or 19d to close, causing motor 17 to rotate.

A small lamp 26 secured to the case of bearing repeater 12 but mounted axially with top plate 12a projects the marking of the center of bearing repeater 12 on the chart or map.

Inasmuch as bearing indicators 12 are placed on table 11 to correspond to the location of known landmarks, and further inasmuch as the rotational position of each bearing indicator 12 is controlled by a pelorus aimed at the corresponding landmark, it is apparent that there is provided an automatic control to maintain position indicator 13 at the location of table 11 corresponding to the actual position of the ship with relation to the fixed landmarks.

The calibrations on card 13b make possible rapid plotting of course and distances obtained from various special apparatus aboard vessels and the invention can be used for the making of hydrographic surveys, or the like, as well as for wartime uses such as the plotting of locations of submarines or mines, or the like.

Because the central axis of scale 13b of indicator 13 is always at a known position relative to the fixed landmarks, any other object of which the range or distance and relative bearing from the ship is known can immediately be plotted on the chart by means of the relative bearing scale 13b and the range or distance rings 32, the scale of which is substantially identical with that of the chart. Distortion of the projected scale can be minimized by the employment of a suitable conventional optical projection system.

Obviously many modifications and variations of the present invention are possible in the light of the above teachings. It is therefore to be understood that within the scope of the appended claims the invention may be practiced otherwise than as specifically described.

I claim:

1. Switching apparatus for use with a craft-position repeater having a plate adjustable rotatably in accordance with changes in orientation of the craft, said apparatus comprising a rotary member coupled to said plate and adapted to be maintained in spaced parallel relation therewith for all positions of said plate, a plurality of coplanar conductive segments carried by said member and connected to electrical circuits to be switched, a conductive lever mounted for rotation spaced from and relative to said segments and in a plane parallel to the plane of said segments, said lever being mounted for tilting movement in a plane perpendicular to the plane of said segments, a grooved wheel carried by said lever over the fulcrum thereof, and a cable engaging the groove of said wheel to tilt said lever and close contact thereof with one of said segments upon rotation of said lever relative said cable.

2. Switching apparatus for use with a craft-position repeater having a plate adjustable rotatably in accordance with changes in orientation of the craft, said apparatus comprising a rotary member coupled to said plate, means to maintain said member in spaced parallel relation with said plate for all positions of said plate, a plurality of coplanar conductive segments carried by said member and connected to electrical circuits to be switched, a conductive lever mounted for rotation spaced from and relative to said segments and in a plane parallel to the plane of said segments, said lever being mounted for tilting movement in a plane perpendicular to the plane of said segments, a grooved wheel carried by said lever over the fulcrum thereof, said wheel being rotatable on an axis parallel to the plane of said segments and to the length of said lever, and a cable engaging the groove of said wheel to tilt said lever and close contact thereof with one of said segments upon rotation of said lever relative said cable.

ROBY BYRON WHITE, Jr.

References Cited in the file of this patent

UNITED STATES PATENTS

| Number | Name | Date |
|---|---|---|
| 1,624,391 | Clausen | Apr. 12, 1927 |
| 2,297,652 | Henry | Sept. 29, 1942 |
| 2,446,881 | Miller | Aug. 10, 1948 |
| 2,611,051 | Kolff | Sept. 16, 1952 |
| 2,643,306 | Hamilton | June 23, 1953 |